Patented July 8, 1930

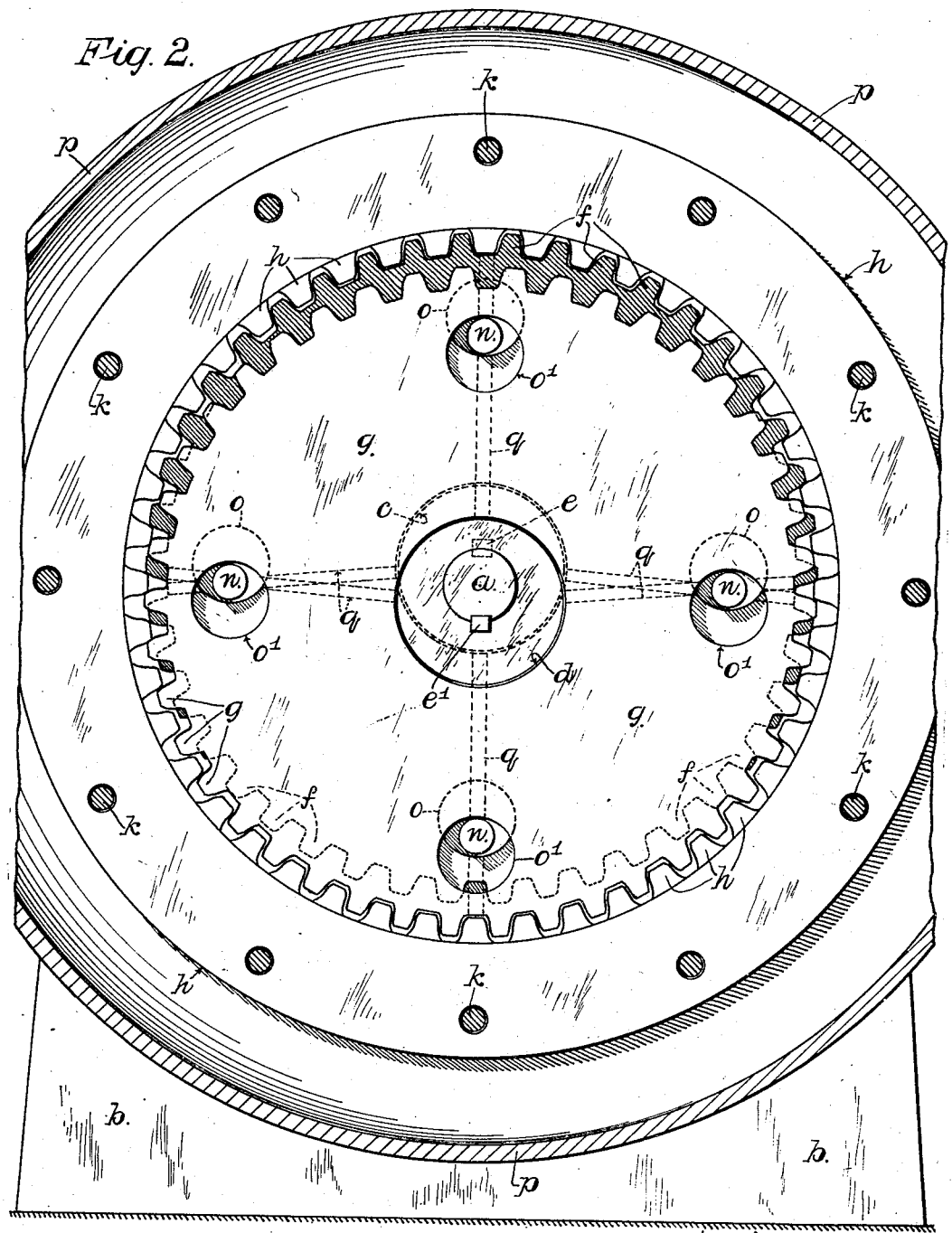

1,770,035

UNITED STATES PATENT OFFICE

WALTER HEAP, OF LIVERPOOL, WILLIAM GEORGE READ, OF PRESCOT, JAMES BARNES, OF LIVERPOOL, AND GEORGE NELSON KERMODE, OF WATERLOO, ENGLAND

SPEED-REDUCTION GEARING

Application filed September 7, 1928, Serial No. 304,578, and in Great Britain September 9, 1927.

This invention relates to speed reduction gearing of the kind in which an eccentric secured to a driving shaft, or the like, has loosely mounted upon it an externally-toothed wheel which engages an internally-toothed wheel secured to a driven shaft, or the like, on the same centre line as said driving shaft; and spaced stationary pins or studs extending through holes provided in said externally-toothed wheel: so that when said driving shaft is rotated the externally-toothed wheel gyrates and causes the rotation of the internally-toothed wheel and driven shaft.

Our invention has for its object to provide gearing of the type referred to in which the stresses on the output—i. e. internally-toothed—wheel shall be evenly distributed and the loading of the teeth of the gearing relatively low.

The gearing of our invention is characterized by the employment of a plurality of eccentrics which are appropriately "set" on the driving shaft or the like, an externally-toothed wheel mounted loosely on each eccentric, and a single internally toothed wheel with which all of said externally-toothed wheels engage in balanced disposition.

We will further describe our invention with the aid of the accompanying sheet of explanatory drawings which illustrate, by way of example only, one mode of embodying same.

In said drawings:—

Fig. 2 is a section, taken as on line A—A Fig. 1.

Figure 1:
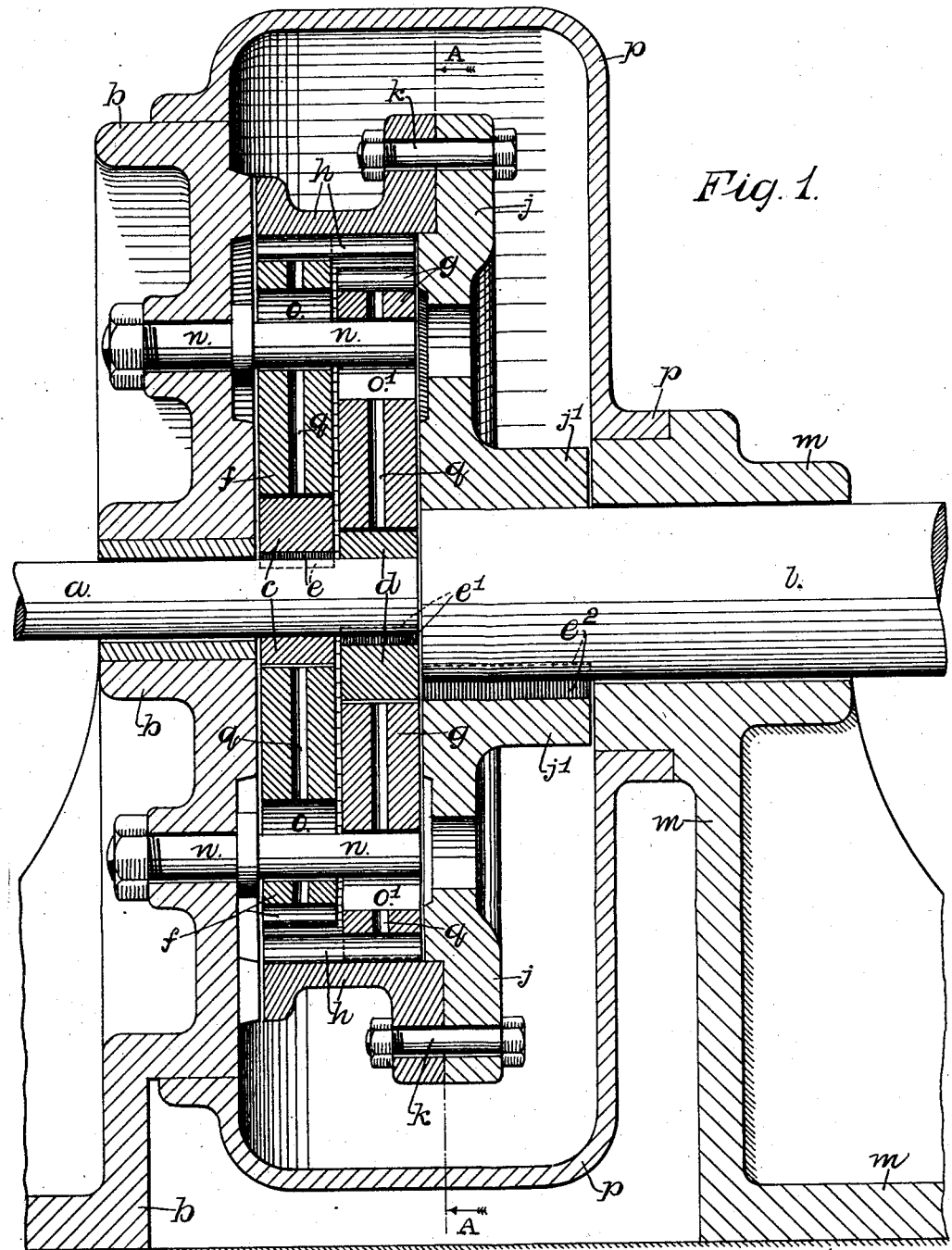
Fig. 1 is a vertical section of the gearing.

$a$ indicates a driving shaft carried in a bracket $b$, and whereto eccentrics $c$, $d$,—"set" in diametrical opposition—are, respectively, secured by means of keys $e$, $e^1$.

On said eccentric $c$ is loosely mounted an externally-toothed wheel $f$, and on said eccentric $d$ is loosely mounted an externally-toothed wheel $g$: Said externally-toothed wheels $f$, $g$ mesh with diametrically opposed teeth of an internally-toothed wheel $h$ which is sufficiently wide to receive both of said externally-toothed wheels $f$, $g$.

Said internally-toothed wheel $h$ is secured to a plate $j$ by means of bolts $k$, said plate $j$ being provided with a boss $j^1$ which is secured by key $e^2$ to a driven shaft $l$ on the same centre line as the driving shaft. A bracket $m$ carries said driven shaft $l$.

Said bracket $b$ carries four round pins $n$ positioned on diameters at right angles to each other. In each of said externally-toothed wheels $f$, $g$ are four circular holes $o$, $o^1$, respectively, through which holes said pins $n$ extend, said holes being larger in diameter than the pins by the difference between the diameters of the internally-toothed wheel $h$ and the externally-toothed wheels $f$, $g$. Said pins, being stationary, are adapted to resist rotary motion of the externally-toothed wheels $f$, $g$ whilst permitting same to gyrate.

The whole of the gearing is enclosed in a liquid-tight casing $p$ which is filled with oil so that all parts are lubricated, the eccentrics $c$, $d$ and pins $n$ being lubricated by the aid of the oil passages $q$.

In operation, said driving shaft $a$ is rotated by any suitable means and at any desired speed, and the consequential rotation of the eccentrics $c$, $d$ causes said externally-toothed wheels $f$, $g$ to gyrate around the stationary resistance pins $n$. Such gyration of the externally-toothed wheels $f$, $g$ causes the rotation of the internally-toothed wheel $h$, and so the driven shaft $l$ rotates in the same direction as the driving shaft, but at a lesser speed.

It is to be noted that due to the employment of a pair of externally-toothed wheels $f$, $g$, and their engagement in the balanced manner described with the common internally-toothed wheel $h$, the loading or torque stresses on said latter wheel are evenly distributed and the tooth load of the gearing is relatively low.

The practical advantages of the construction and arrangement before described are:—

1. The gearing occupies small space in relation to the power capable of being transmitted.

2. The even distribution of loading or torque stresses on said internally-toothed wheel ensures steady transmission of power.

3. As the gearing is at all times in balance, its acquisition of periodic or sympathetic vibrations is obviated.

4. The comparatively low tooth loading results in substantial reduction in the so-called "flaking" of the teeth.

In the example of gearing illustrated, said internally-toothed wheel $h$ is provided with 44 teeth, and the externally-toothed wheels $f$, $g$ are each provided with 42 teeth; consequently the eccentrics $c$, $d$ (i. e. the driving shaft $a$) will make twenty two revolutions to one of the driven shaft $l$. In other words, the angular movement of the internally-toothed wheel $h$ is $\frac{360}{22}=16.36$ degrees for each complete revolution of the driving shaft $a$.

If the number of teeth of the respective toothed wheels be varied so will the ratio of reduction be altered. For instance, if the externally-toothed wheels are provided with 40 teeth and the internally-toothed wheel is provided with 44 teeth, the reduction ratio will be eleven to one.

It will be noted that the externally-toothed wheels $f$, $g$ gyrate and the internally-toothed wheel $h$ rotates around a common centre which is that of both driving and driven shafts.

It is to be clearly understood that we do not confine our invention to the precise form of embodiment hereinbefore described, as various changes or modifications may be made to meet differing conditions or circumstances without departing from its spirit and scope. As instances of constructional variations, the number of eccentrics and gyrating externally-toothed wheels operated thereby may be increased, the internally-toothed wheel being, of course, appropriately widened to accommodate the gyrating wheels which will be equi-spaced in relation to said internally-toothed wheel in order to maintain the balance. And/or the number of stationary resistance pins $n$, or the like, and corresponding holes in the gyrating wheels may be varied.

What we claim as our invention and desire to secure by Letters Patent is:—

As a means for transmitting rotary motion between axially alined drive and driven shafts under lubrication bath conditions, with the shaft movement in similar directions and with a speed reduction characteristic, a stationary lubrication-carrying casing carrying axially-alined spaced-apart bearings to support the drive and driven shafts respectively, axially-alined drive and driven shafts extending into the space between the bearings, a succession of symmetrically-disposed eccentrics on the drive shaft within the space, a gear for and carried by each eccentric and held to gyratory motion within a limited range during movement of the drive shaft, said gears having suitably-spaced openings whereinto correspondingly arranged stationary pins extend and walls of which openings define the gyratory limits of the gears, an annular gear common to the gyratory gears, a support for the annular gear, said support being carried by the driven shaft and arranged to locate the gear teeth path of travel of the annular gear as concentric with the driven shaft axis, said support and annular gear being located within and spaced from the walls of the casing, said support having openings adapted to permit passage of lubricant into the operating zone of the eccentrics and the gyrating and annular gears, said annular gear support openings being located to deliver lubricant to said gyrating gear openings and to lubricating ducts in the gyrating gears to feed lubricant to the eccentric surfaces and to the tooth zone of the gears, whereby the annular gear will be advanced by the intermittent activity of the teeth of the gyrating gears with the activity made manifest concurrently at symmetrically-disposed points of the tooth zone of the annular gear and be lubricated from the casting lubricant supply.

In testimony whereof we affix our signatures.

WALTER HEAP.
WILLIAM GEORGE READ.
JAMES BARNES.
GEORGE NELSON KERMODE.